March 14, 1933.  J. J. RING  1,901,776
TURBINE CONTROL SYSTEM
Filed April 7, 1932
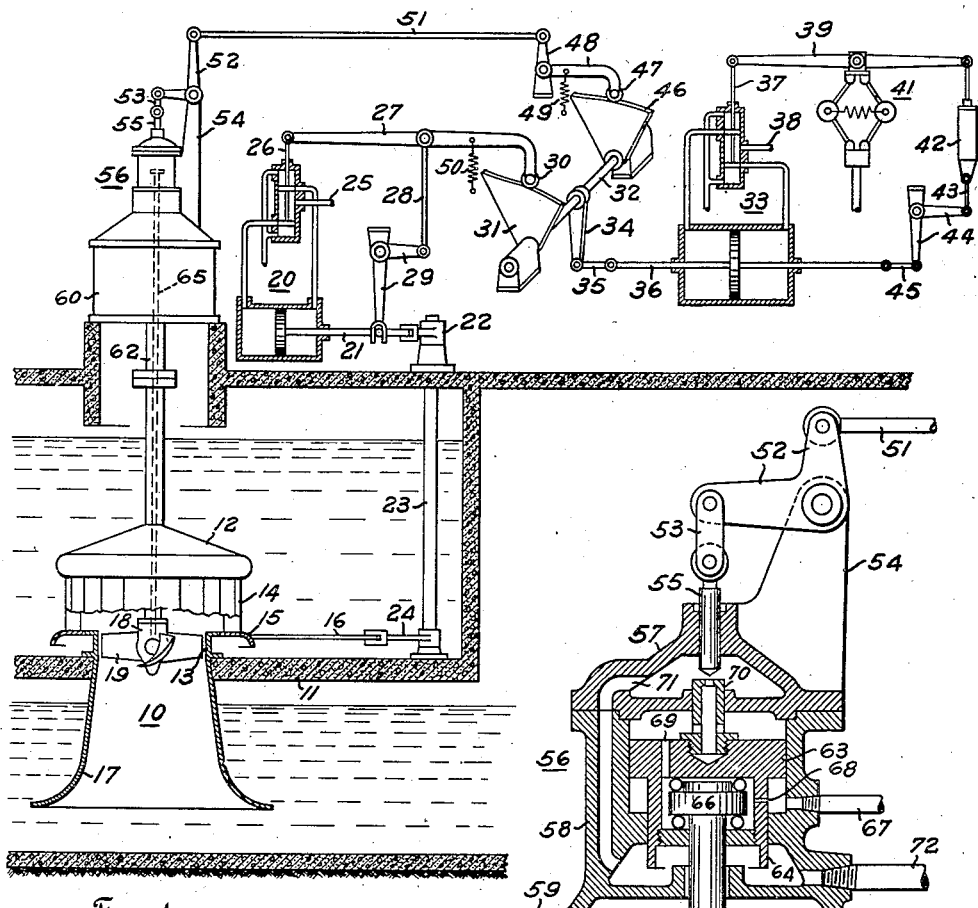
Fig. 1
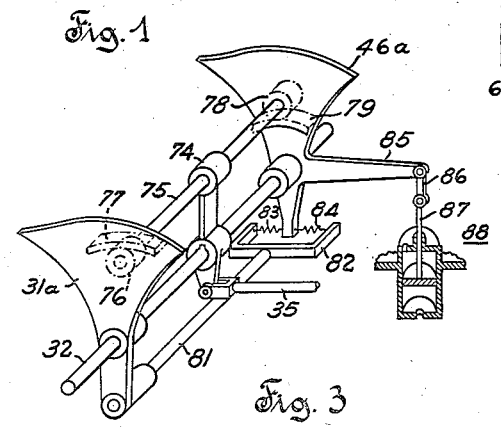
Fig. 3
Fig. 2
Inventor
J. J. Ring
by
Attorney Patented Mar. 14, 1933

1,901,776

UNITED STATES PATENT OFFICE

JOSEPH J. RING, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

TURBINE CONTROL SYSTEM

Application filed April 7, 1928. Serial No. 268,762.

This invention relates in general to control systems for hydraulic energy translating devices, and more particularly to a control system wherein it is desirable to tilt the rotor blades and move the guide vanes of such translating devices to obtain maximum efficiency as the load thereon varies.

In the operation of a hydraulic turbine with tiltable rotor blades there is a definite position of the rotor blades for each guide vane opening for the most efficient operation of the turbine. When the load on the turbine changes from 50% to full load, the movement of the guide vanes would be very small, but the tilting movement of the rotor blades would be great (approximately 75% of the range of movement thereof) to maintain maximum efficiency. When the load on the turbine changes from 50% to no load, the movement of the guide vanes would be quite great, but the tilting movement of the rotor blades would be small to maintain maximum efficiency. In the hydraulic turbine systems heretofore used, the guide vanes are controlled directly by a governor controlled servo-motor in response to load changes and the rotor blades are caused to follow the movement of the guide vanes, but in this arrangement the governor action is sluggish when the turbine is operating at low loads and is liable to cause the guide vanes to move more than necessary when the turbine is operating under large loads. In other words, the governor sensitivity is not uniform for equal speed changes throughout the load range of the turbine.

It is therefore an object of this invention to provide a turbine control system in which the sensitivity of the speed responsive governor is uniform throughout the operating range of the turbine.

Another object of this invention is to provide a turbine control system in which a speed responsive governor actuates a pair of cams which in turn control the movement of the guide vanes and the rotor blades respectively.

A further object of this invention is to provide a turbine control system in which the position of the guide vanes and the rotor blades are controlled by a pair of governor actuated cams.

It is also an object of this invention to provide an improved turbine control system in which the tilting movement of the rotor blades is caused to lag behind the movement of the guide vanes.

These and other objects and advantages are obtained by this invention, various novel features of which will be apparent from the description and drawing herein, and will be more particularly pointed out in the claims.

An illustrative example of the application of the invention is shown in the accompanying drawing in which:

Fig. 1 shows a control system for a hydraulic turbine embodying the present invention.

Fig. 2 shows more in detail the construction of a rotor blade tilting servo-motor and its control valve.

Fig. 3 is a modified form of cam mechanism embodying the present invention.

Referring now to Fig. 1, 10 is a hydraulic turbine mounted on foundation 11 and has a upper casing 12 and a lower casing 13 with movable guide vanes 14 mounted therebetween. A guide vane adjusting ring 15 is rotatable about the lower casing member 13 by means of an operating rod 16. A draft tube 17 of usual construction is located below the lower turbine casing. A turbine rotor of the propeller type is provided with a hub member 18 containing suitable mechanism for tilting the rotor blades 19, noting that the patent to J. J. Ring, U. S. 1,685,756, September 25, 1928, shows one form of mechanism suitable for this purpose.

The guide vanes 14 are adjustably moved by servo-motor 20 by means of piston rod 21, crank arm 22, rod 23, crank arm 24, and rod 16. Servo-motor 20 is controlled by a pilot valve having stem 26 which is pivotally connected to floating lever 27. Servo-motor 20 is actuated by fluid under pressure supplied from pipe 25. Floating lever 27 is pivotally carried by link member 28 which is connected to bell crank 29, noting the lower arm of this bell crank is pivotally connected to piston rod 21. The right hand end of floating lever 27 is provided with a roller 30 which is adapted to be pressed into engagement with cam 31 by means of spring 50. Cam 31 is attached to shaft 32 which is carried by suitable bearings. Shaft 32 is rotatable by servo-motor 33 through crank arm 34, link 35, and piston rod 36.

Servo-motor 33 is controlled in a usual manner by a pilot valve having a stem 37 which controls the admission of operating fluid under pressure from inlet pipe 38. Valve stem 37 is pivotally connected to the left hand end of floating lever 39 which is actuated by a flyball governor 41 suitably driven in accordance with the speed of turbine 10. The motion of piston rod 36 is relayed to the right hand end of floating lever 39 in a usual manner through compensator device 42, link 43, bell crank 44 and link 45.

A cam 46 is also attached to shaft 32 and is thus adapted to move simultaneously with cam 31. A roller 47 is carried by one arm of bell crank 48 and is pressed into engagement with cam 46 by spring 49. The other arm of bell crank 48 is suitably connected to valve stem 55 of rotor blade tilting servo-motor 56 by means of rod 51, bell crank 52, and link 53.

Any suitable type of rotor blade tilting servo-motor may be used. However, a servo-motor of the type wherein the amount of movement of a control valve directly determines the amount and rate of travel of the servo-motor piston is herein shown in Fig. 2. In general the servo-motor shown in Fig. 2 comprises a cylinder head 57 having a bore adapted to receive valve stem 55, and a cylinder member 58 provided with a base portion 59 for connection to the generator frame 60 in which guide bearing 61 for generator shaft 62 is located. Cylinder member 58 is provided with a bore in which piston 63 is adapted to slide. Piston 63 is provided with a sleeve portion 64 which is adapted to slide through another bore in cylinder 58. Rotor blade tilting rod 65 is rotatably connected to piston 63 by means of a double thrust bearing 66. Servo-motor 56 is also provided with a pressure inlet pipe 67 which is adapted to conduct fluid under pressure through orifice 68, around thrust bearing 66, through passage way 69, out valve member 70, through drain conduit 71 and out drain pipe 72.

Upon raising of valve stem 55 the pressure of the fluid above piston 63 drops by reason of the small orifice 68 thereby causing the piston 63 to rise under the influence of the operating fluid within the annular space between sleeve 64 and cylinder 58. Upward movement of piston 63 causes valve member 70 to restrict the passageway therethrough, thus permitting pressure to build up in the space above piston 63 until equilibrium is established. The effective area of the upper side of piston 63 is greater than the effective area of the lower side thereof, consequently it is possible to move piston 63 downward by moving valve stem 55 downward to restrict the opening in valve member 70.

The modified form of cam mechanism shown in Fig. 3 comprises a shaft 32 upon which cams 31A and 46A are free to rotate. A lever 74 is fixedly attached to shaft 32 and is provided with a depending portion adapted to be connected to piston rod 36 of servo-motor 33 by means of link 35. The upper portion of lever 74 is provided with a bearing for carrying shaft 75 which is free to rotate therein. One end of shaft 75 has attached thereto a pinion 76 which meshes with gear sector 77 of cam 31A. The outer end of shaft 75 has attached thereto a pinion 78 which meshes with gear sector 79 of cam 46A. It is to be noted that 77 is a sector of an internal ring gear, whereas, 79 is a sector of an external ring gear. A shaft 81 is fixedly attached to a depending portion of cam 31A and is provided with a forked portion 82. Centering springs 83 and 84 are connected between the ends of forked portion 82 and a depending portion of cam 46A. Cam 46A is also provided with an arm 85 to which the piston rod 87 of a dash-pot 88 is connected by means of link 86. It is to be understood that the cam mechanism shown in Fig. 3 may be substituted for the cam mechanism shown in Fig. 1.

The operation of the system is as follows:

The various elements of the system shown in Fig. 1 are in positions corresponding to substantially half load operating conditions on the turbo-generator unit. Upon decrease in turbine speed due to an increase of load, the flyballs of governor 41 will move inwardly thereby lifting floating lever 39 and valve stem 37 which causes fluid under pressure to flow from inlet pipe 38 through the left hand inlet pipe of servo-motor 33. Servo-motor 33 is thereupon caused to rotate cams 31 and 46 in a counter-clockwise direction. Roller 30 in following the contour of cam 31 causes floating lever 27 to pivot on link 28 thereby lifting valve stem 26 which permits fluid under pressure to flow from inlet pipe 25 to the right hand side of servo-motor 20. Servo-motor 20 is thereupon caused to move guide vanes 14 through linkage comprising piston rod 21, crank arm 22, shaft 23, crank arm 24, rod 16 and actuating ring 15 to admit more water to the turbine 10. The motion of guide vanes 14 is relayed through the above described linkage to bell crank 29 so as to cause link 28 to move downwardly to restore valve stem 26 to its neutral position.

Roller 47 in following cam 46 moves bell crank 48 in a clockwise direction thereby causing valve stem 55 of servo-motor 56 to move upwardly. Referring more particularly to Fig. 2, upward movement of valve stem 55 reduces the restriction of the opening in valve member 70 thereby decreasing the fluid pressure on the upper surface of piston 63 so that piston 63 is caused to move rotor blade tilting rod 65 upwardly. Upward movement of rod 65 causes rotor blades 19 to increase their tilt, that is, to become more nearly parallel with the axis of the rotor. The tilting movement of servo-motor 56 is stopped when piston 63 moves upwardly to such a point that the opening in valve member 70 is so restricted that the pressure on the upper surface of piston 63 substantially equals the pressure on the lower surface of this piston.

It is to be noted that motion of piston rod 36 to the right is relayed to the right hand end of floating lever 39 through linkage comprising link 45, bell crank 44, link 43 and compensator 42 to thereby restore valve stem 37 to its neutral position. It is thus seen that the above described relay mechanism is not connected directly to the guide vane adjusting mechanism as has been the practice heretofore.

Upon increase of speed due to a decrease of load, the flyballs of governor 41 will move outwardly thereby depressing floating lever 39 and valve stem 37 which causes fluid under pressure to flow from inlet pipe 38 through the right hand inlet pipe of servo-motor 33. Servo-motor 33 is thereupon caused to rotate cams 31 and 46 in a clockwise direction. Roller 30 in following cam 31 will cause valve stem 26 to move downwardly thereby causing servo-motor 20 to move guide vanes 14 in such a direction as to restrict the flow of water to turbine 10. Roller 47 in the following cam 46 causes valve stem 55 to move downwardly thereby causing servo-motor 56 to move rotor blade tilting rod 65 in such a direction that the rotor blades are flattened. It is thus seen that as the speed of the turbine changes in response to changes of load, the guide vanes and rotor blades will be simultaneously moved in such directions as to restore the speed of said turbine and to adjust the tilt of the rotor blades for maximum efficiency.

Referring now to the operation of the system employing the cam mechanism shown in Fig. 3, upon decrease of speed due to an increase of load piston rod 36 will be caused to move to the right as above described and lever arm 74 will therefore be caused to rotate in a counter-clockwise direction. The counter-clockwise movement of shaft 75 relative to shaft 32 will not immediately cause movement of cam 46a by reason of the fact that dash-pot 88 will temporarily hold this cam stationary. The counter-clockwise movement of shaft 75 will therefore cause pinion 78 to rotate in a counter-clockwise direction on gear sector 79. The counter-clockwise rotation of gear 78 as well as the translatory movement of shaft 75 will be transmitted to pinion 76 which thereby causes cam 31a to rotate in a counter-clockwise direction. Due to the fact that a translatory motion as well as rotation is imparted to shaft 75, the cam member 31a will be caused to move substantially twice as far as would be the case of cam 31a was fixed to shaft 32 for a purpose to be hereinafter described.

Roller 30 in following cam 31a will cause valve stem 26 to move downwardly thereby causing servo-motor 20 to move guide vanes 14 so as to increase the flow of water through turbine 10. Cam 31a in moving in a counter-clockwise direction causes cam 46a to be biased in a counter-clockwise direction by means of centering springs 83, 84. Cam 46a is therefore permitted to slowly rotate in a counter-clockwise direction at a speed determined by the adjustment of dash-pot 88. It is noted that the counter-clockwise rotation of cam 46a causes clockwise rotation of pinion 78 which thereupon drives pinion 76 in a clockwise direction. The clockwise rotation of pinion 76 thus moves cam 31a toward its initial position in a clockwise direction as cam 46a is moving in a counter-clockwise direction. The combined movement of cam 31a and 46a will in time cause the depending portion of cam 46a to move to a neutral position relative to centering springs 83 and 84. Roller 47 in following cam 46a raises valve stem 55 so that servo-motor 56 increases the tilt of the rotor blades 19.

Inasmuch as the guide vanes can be made to operate in a much shorter time than the rotor blades, the above described cam mechanism permits the guide vanes to be opened an amount more than finally necessary upon increase of load and permits the rotor blades to slowly assume the position of maximum efficiency. Since the movement of the rotor blades 19 to their more efficient position after a movement of the guide vanes 14 has the tendency to cause the turbine to operate at a higher speed due to the increased efficiency, it is possible with this mechanism to reduce the guide vane opening as the rotor blades are moved toward their final position and to thereby maintain the same speed with a smaller flow of water.

Upon increase of speed due to a decrease of load, the servo-motor 33 is caused to rotate lever 74 in a clockwise direction, and the consequent operation of the system to decrease the flow of water to turbine 10 and to flatten the tilt of the rotor blades is substantially the converse of the above described operations.

In this specification, governor sensitivity is defined as the time necessary for the governor system to restore to normal the speed of the turbine upon the occurrence of a predetermined reduction or increase in load, and may be expressed in seconds per kilowatt. Uniform sensitivity of the governor control system may be obtained by predetermining the shape of cams 31 and 46 in Fig. 1 and cams 31a and 46a in Fig. 3. In general, the cams (31 and 31a) for controlling the guide vane opening will be steepest on the portion of these cams corresponding to no load to half load, and the cams (46 and 46a) for controlling the tilt of the rotor blades will be steepest on the portion of these cams corresponding to half load to full load.

From the foregoing description, it will be apparent that the present invention provides a relatively simple and dependable system for adjusting the rotor blades of a hydraulic turbine in accordance with the position of the guide vanes. The construction is particularly applicable to high speed rotary machines such as hydraulic turbines and pumps, however, it should be understood that it is not desired to limit the invention to the exact details of construction and operation herein shown and described, inasmuch as various modifications within the scope of the claims may be apparent to persons skilled in the art.

It is claimed and desired to secure by Letters Patent:

1. In combination, a hydraulic energy translating device having tiltable rotor blades and movable guide vanes, a servo-motor for tilting said rotor blades, a second servo-motor for moving said guide vanes, a cam for controlling the actuation of said rotor blade tilting servo-motor, another cam for controlling the actuation of said guide vane moving servo-motor, and means responsive to the speed of said translating device for controlling the actuation of said cams.

2. In combination, a hydraulic energy translating device having tiltable rotor blades and movable guide vanes, a servo-motor for tilting said rotor blades, a second servo-motor for moving said guide vanes, a cam for controlling the actuation of said rotor blade tilting servo-motor, another cam for controlling the actuation of said guide vane moving servo-motor, a single speed responsive governor device, and means for causing said governor device to move both of said cams to obtain maximum efficiency when the speed of said translating device changes with variation in load.

3. In combination, a hydraulic energy translating device having tiltable rotor blades and movable guide vanes, a servo-motor for tilting said rotor blades, a second servo-motor for moving said guide vanes, a cam for controlling the actuation of said rotor blade tilting servo-motor, another cam for controlling the actuation of said guide vane moving servo-motor, a third servo-motor for actuating said cams, and means responsive to the speed of said translating device for controlling said third servo-motor.

4. A system for controlling the rotor blade tilt and the guide vane opening of a turbine, comprising in combination, a servo-motor for tilting said rotor blades, a second servo-motor for actuating said guide vanes, a cam for controlling said rotor blade tilting servo-motor, a second cam for controlling said guide vane actuating servo-motor, a third servo-motor for simultaneously actuating both of said cams, and a speed responsive governor for controlling said third servo-motor.

5. A system for controlling the rotor blade tilt and the guide vane opening of a turbine, comprising in combination, a servo-motor for tilting said rotor blades, a second servo-motor for actuating said guide vanes, governor mechanism responsive to the speed of said turbine, and means comprising a pair of cams actuated by said governor mechanism for so controlling both of said servo-motors that the sensitivity of said governor mechanism remains substantially constant as the load on said turbine varies.

6. In combination, a turbine having tiltable rotor blades and movable guide vanes, means comprising a cam controlled servo-motor for tilting said rotor blades, means comprising a second cam controlled servo-motor for moving said guide vanes, a governor mechanism responsive to the speed of said turbine, and resilient connecting means between said governor mechanism and said cams.

7. In combination, a turbine having tiltable rotor blades and movable guide vanes, a servo-motor operatively connected to said rotor blades, a second servo-motor operatively connected to said guide vanes, means comprising a pair of cams for controlling said servo-motors respectively, governor means responsive to the speed of said turbine, and connecting means between said governor means and said cams for first actuating the cam controlling said second servo-motor and then actuating the other of said cams.

8. In combination, a turbine having tiltable rotor blades and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, means for inter-relating the movement of said cams, and means for actuating said last mentioned means in accordance with the movement of said governor.

9. In combination, a turbine having tiltable rotor blades, and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, means comprising gears and a dash-pot for causing said second cam to move in timed sequence after a movement of said first cam, and means for actuating said last named means upon movement of said governor.

10. In combination, a turbine having tiltable rotor blades and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, and means responsive to movement of said governor for rendering said governor uniformly sensitive throughout the operating range of said turbine.

11. In combination, a turbine having tiltable rotor blades and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, means dependent upon the shape of said cams for causing said servo-motors to operate at rates dependent upon the load on said turbine.

12. In combination, a turbine having tiltable rotor blades and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, means dependent upon the shape of said cams for causing said servo-motors to operate upon movement of said governor at such a rate that uniform governor sensitivity is maintained throughout the load range of said turbine.

13. In combination, a turbine having tiltable rotor blades and movable guide vanes, a servo-motor operatively connected with said guide vanes, a second servo-motor operatively connected with said rotor blades, means comprising a first cam for controlling said first servo-motor, means comprising a second cam for controlling said second servo-motor, a speed responsive governor, means dependent upon the shape of said cams for causing said servo-motors to operate upon movement of said governor at such a rate that uniform governor sensitivity and maximum efficiency is maintained throughout the load range of said turbine.

14. In combination, a turbine having movable guide vanes, a servo-motor operatively connected with said guide vanes, governor means responsive to the speed of said turbine, means actuated by said governor means for controlling operation of said servo-motor said means comprising a cam having such a contour that said servo-motor will operate at different predetermined rates throughout the operating range of said governor means.

15. In combination, a turbine having movable guide vanes, a servo-motor operatively connected with said guide vanes, governor means responsive to the speed of said turbine, a second servo-motor controlled by said governor means, a cam device actuated by said second servo-motor and arranged to control said first mentioned servo-motor, said cam device having such a contour that said governor is effective to compensate for a given speed departure with equal facility throughout the load range of said turbine.

16. In combination, a hydraulic energy translating device having tiltable rotor blades and movable guide vanes, a rotor blade tilting servo-motor, a guide vane actuating servo-motor, and means for controlling the actuation of said servo-motors, said means comprising a pair of cam devices arranged to control said servo-motors respectively, said means also comprising a single speed responsive governor device arranged to actuate both of said cams, the contour of said cams being such that said rotor blade tilting servo-motor will move said rotor blades to their most efficient position with respect to the position of said guide vanes.

In testimony whereof, the signature of the inventor is affixed hereto.

JOSEPH J. RING.